(12) United States Patent
Han et al.

(10) Patent No.: US 12,164,823 B2
(45) Date of Patent: Dec. 10, 2024

(54) DATA PROCESSING METHOD AND ELECTRONIC DEVICE

(71) Applicant: LG ELECTRONICS INC., Seoul (KR)

(72) Inventors: Sang Woo Han, Seoul (KR); Sung Hee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 17/640,109

(22) PCT Filed: Sep. 3, 2019

(86) PCT No.: PCT/KR2019/011348
§ 371 (c)(1),
(2) Date: Mar. 3, 2022

(87) PCT Pub. No.: WO2021/045247
PCT Pub. Date: Mar. 11, 2021

(65) Prior Publication Data
US 2022/0308819 A1    Sep. 29, 2022

(51) Int. Cl.
*G06F 3/14*    (2006.01)
*G06F 13/42*   (2006.01)
*G06F 40/166*  (2020.01)
*G06F 40/58*   (2020.01)

(52) U.S. Cl.
CPC ........ *G06F 3/1423* (2013.01); *G06F 13/4282* (2013.01); *G06F 40/166* (2020.01); *G06F 40/58* (2020.01); *G06F 2213/0012* (2013.01)

(58) Field of Classification Search
None
See application file for complete search history.

(56) References Cited

U.S. PATENT DOCUMENTS 7,761,876 B2 *  7/2010  Oliveira ............. H04L 67/1001
                                                370/260
9,266,473 B1 *  2/2016  Elwell ..................... H04W 4/48
(Continued)

FOREIGN PATENT DOCUMENTS

KR    1020120084749    7/2012
KR    101407725        6/2014
(Continued)

OTHER PUBLICATIONS

MacRumors ("This is the New Apple TV Remote App", MacRumors, https://www.youtube.com/watch?v=-LwwBB6e0xQ, Jun. 27, 2016 hereinafter referred to as "Mac") (Year: 2016).*

(Continued)

*Primary Examiner* — Matthew Yeung
(74) *Attorney, Agent, or Firm* — LEE, HONG, DEGERMAN, KANG & WAIMEY

(57) ABSTRACT

Disclosed is a data processing method of a first electronic device, the data processing method including checking configuration information including information about capabilities of a second electronic device based on identification of the second electronic device connected with the first electronic device, acquiring input data through at least one device related to the first electronic device, determining whether to transmit the input data to the second electronic device based on at least one of relevance of the input data to the second electronic device and the configuration information, transmitting the input data to the second electronic device based on determination of transmission of the input data, receiving output data generated based on the input data from the second electronic device, and outputting the acquired output data through an output device related to the first electronic device.

22 Claims, 16 Drawing Sheets

(56) References Cited

U.S. PATENT DOCUMENTS

| | | | | |
|---|---|---|---|---|
| 10,877,592 | B2* | 12/2020 | Yaginuma | G06F 3/1454 |
| 2014/0172408 | A1* | 6/2014 | Vukosavljevic | G06F 40/58 |
| | | | | 704/2 |
| 2015/0120817 | A1* | 4/2015 | Jeong | H04L 67/10 |
| | | | | 709/203 |
| 2016/0350286 | A1 | 12/2016 | Murthy et al. | |
| 2017/0041779 | A1 | 2/2017 | Sandhu et al. | |
| 2018/0014182 | A1* | 1/2018 | Jaegal | H04W 8/22 |
| 2020/0226087 | A1* | 7/2020 | Sun | H04N 21/442 |
| 2022/0236837 | A1* | 7/2022 | Zhu | G06F 9/451 |

FOREIGN PATENT DOCUMENTS

| | | |
|---|---|---|
| KR | 1020150049583 | 5/2015 |
| KR | 1020170043002 | 4/2017 |
| KR | 1020180037197 | 4/2018 |
| WO | 2019015681 | 1/2019 |

OTHER PUBLICATIONS

Ring ("How to Set Up Your Ring Video Doorbell"; https://www.youtube.com/watch?v=9yTg-iWPy28; Dec. 2016) (Year: 2016).*
Ring ("Ring Video Doorbell—Motion Detection Feature"; https://www.youtube.com/watch?v=qLHy4eqQ_Ic; Feb. 2015) (Year: 2015).*
PCT International Application No. PCT/KR2019/011348, Search Report dated Jun. 2020, 3 pages.
Korean Intellectual Property Office Application No. 10-2022-7005872, Office Action dated Jan. 23, 2024, 7 pages.
MacRumors, "This is the New Apple TV Remote App," https://youtube.com/watch?v=Lww886e0xQ, Jun. 2016, 2 pages.

* cited by examiner

[FIG. 1]
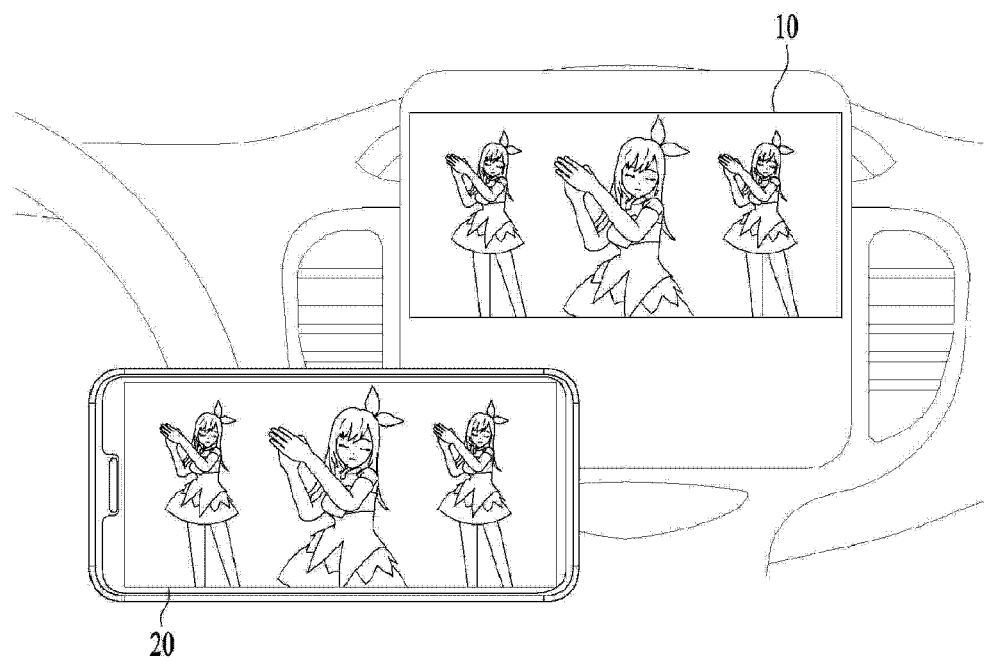

【FIG. 2】
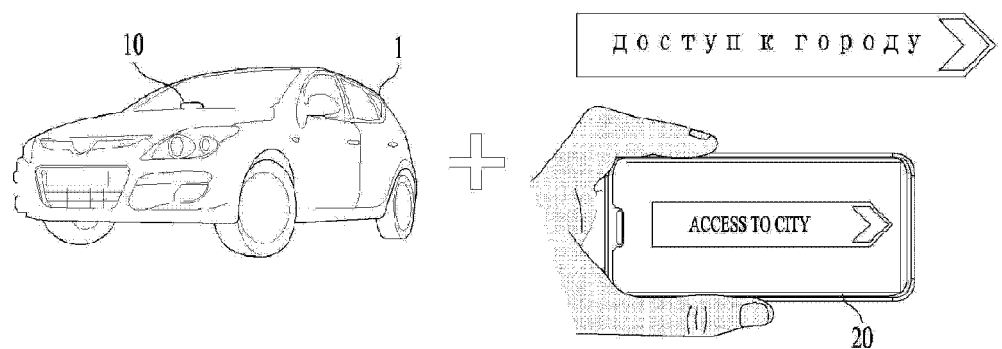

[FIG. 3]
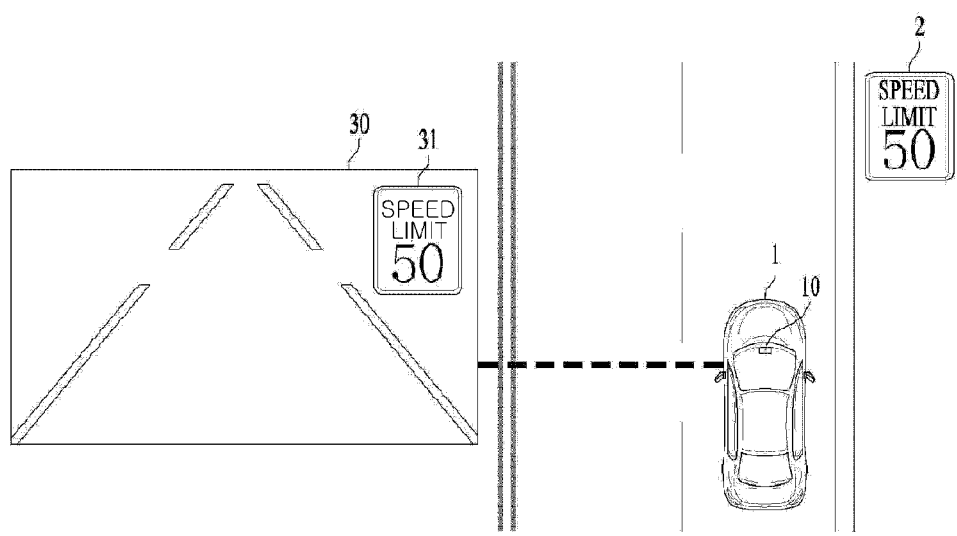

[FIG. 4]
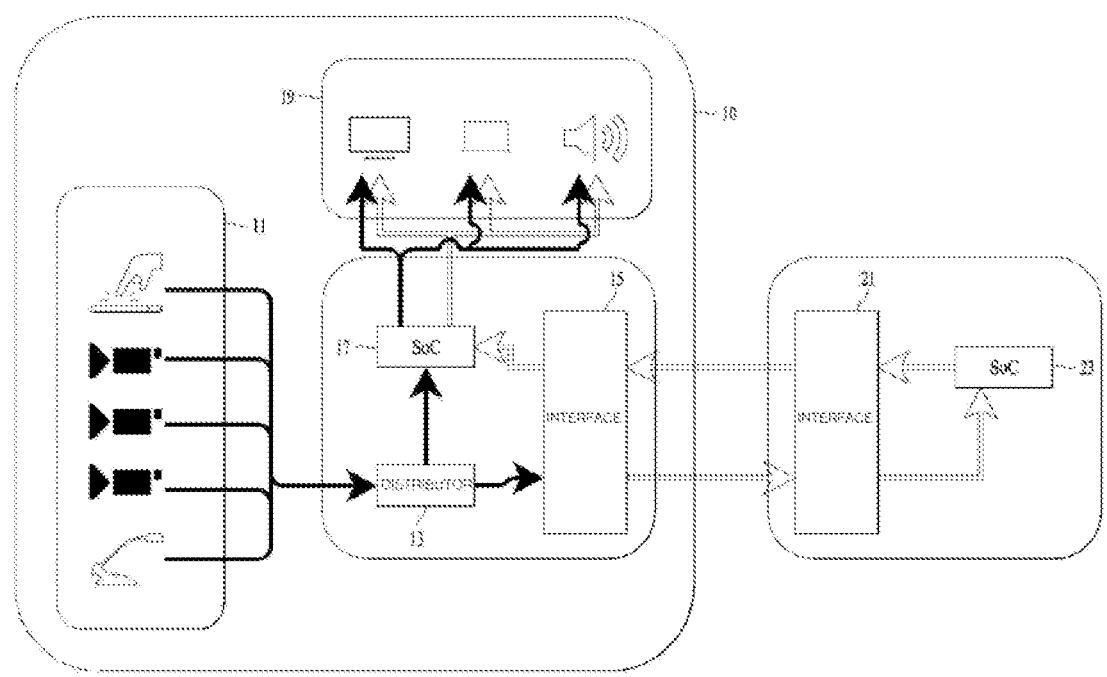

[FIG. 5]
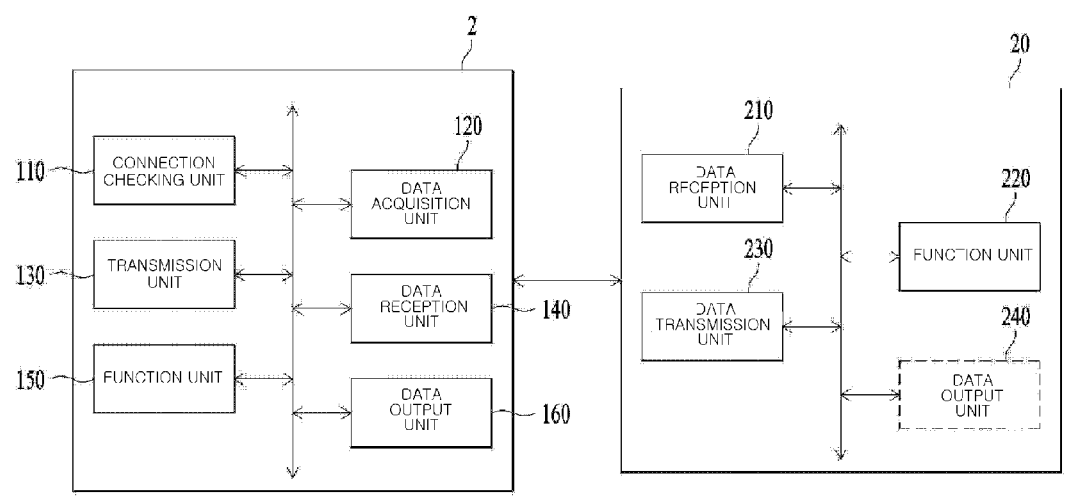

【FIG. 6】
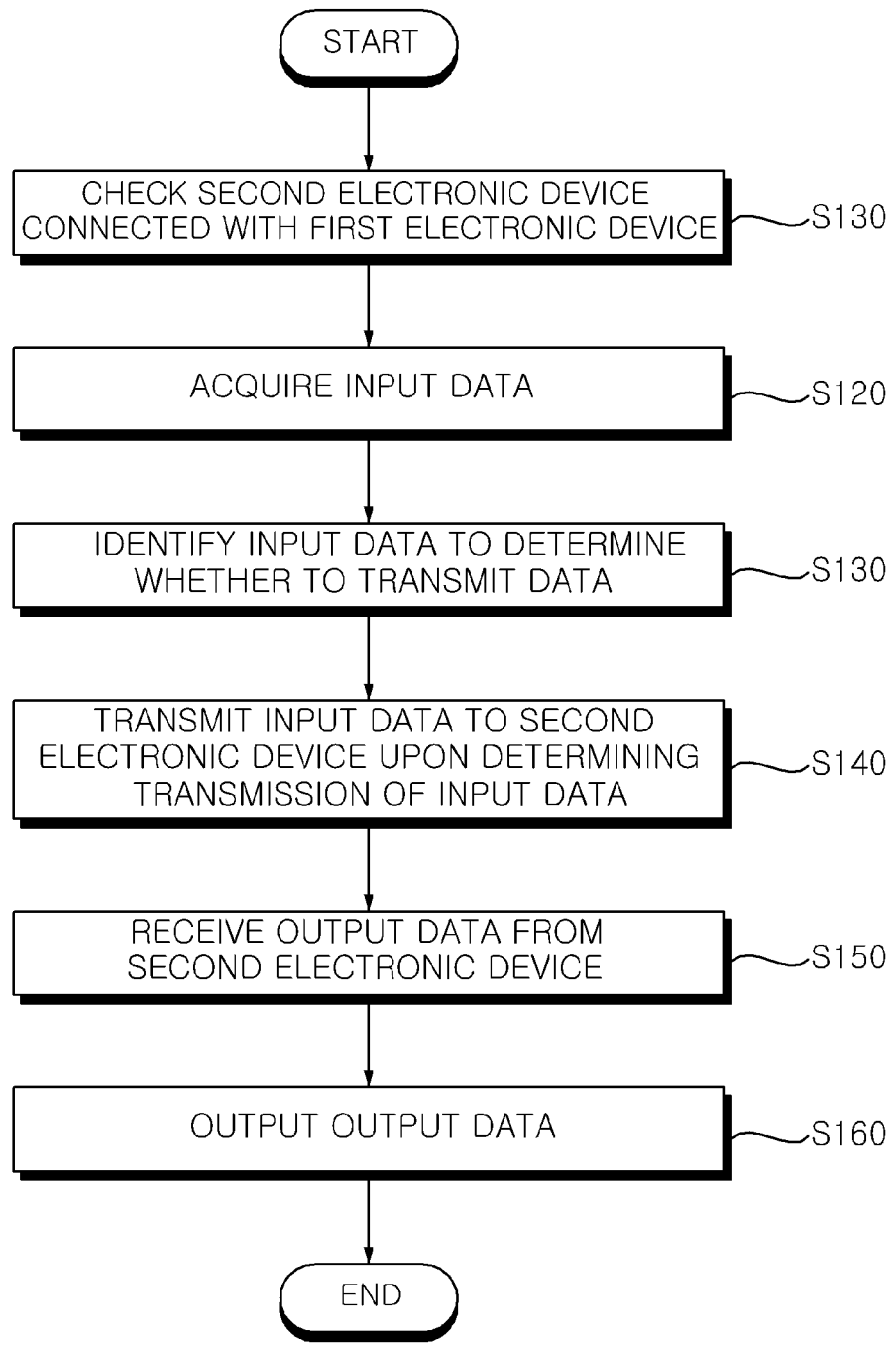

[FIG. 7]
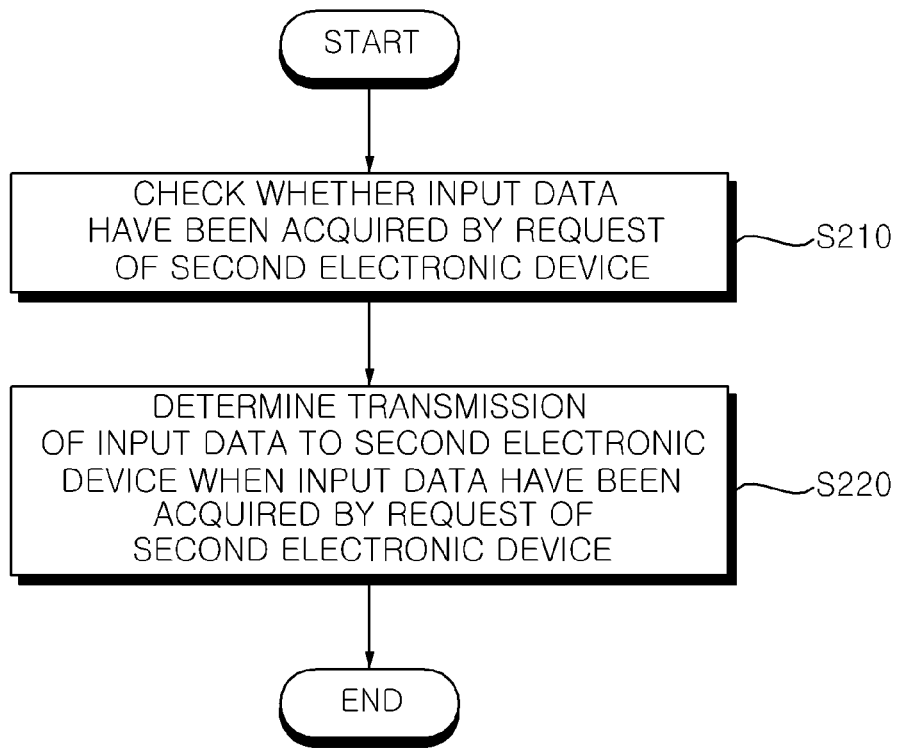

【FIG. 8】
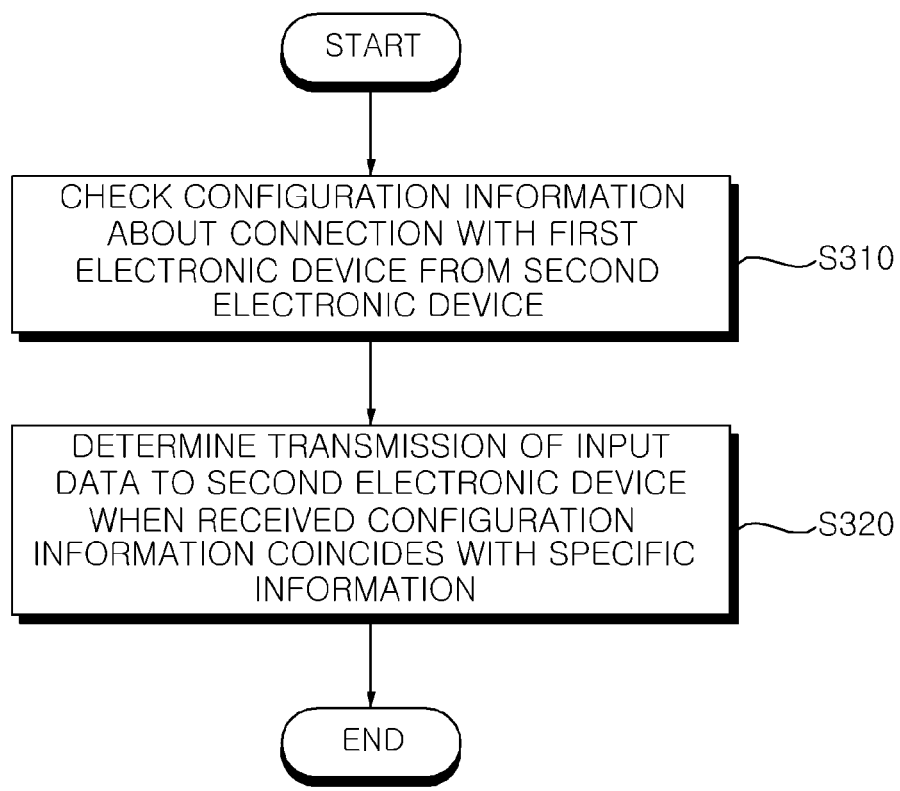

[FIG. 9]
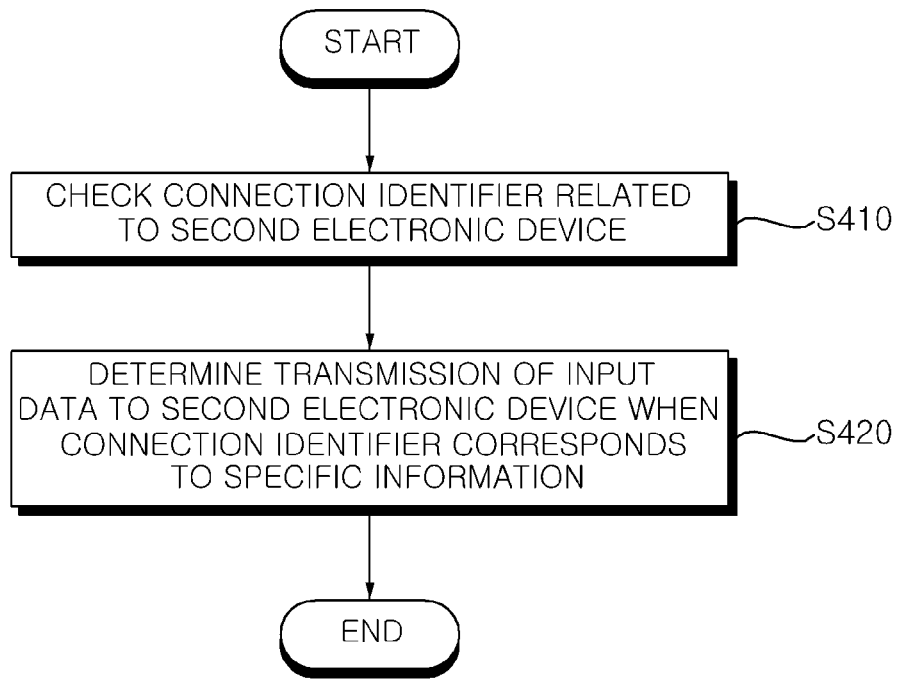

【FIG. 10】
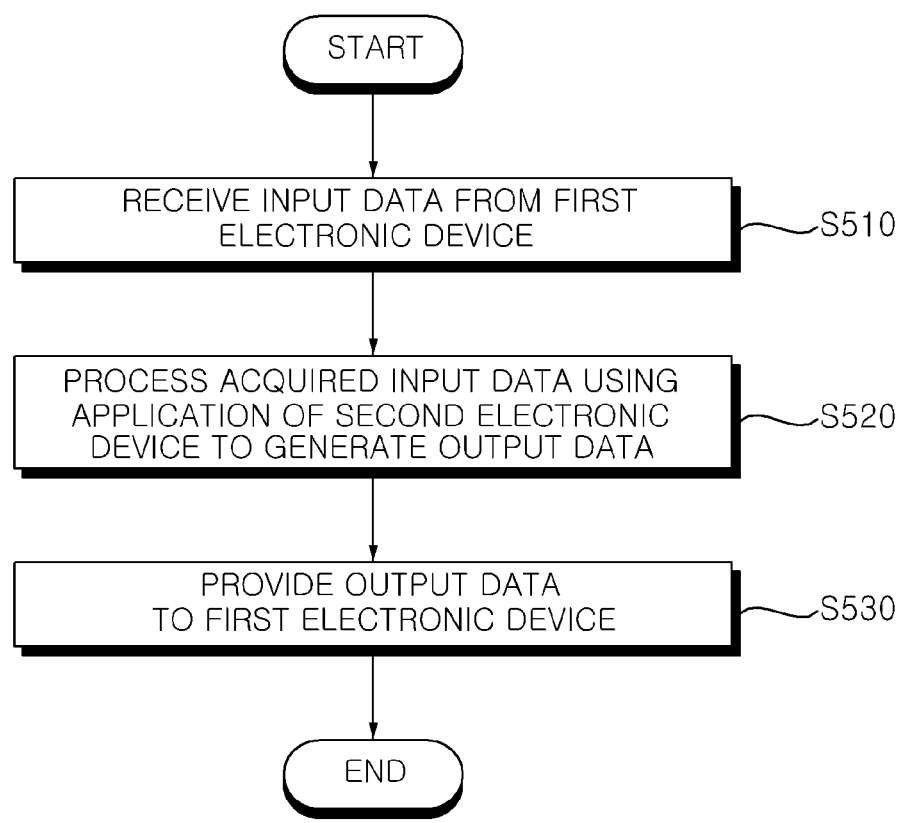

[FIG. 11]
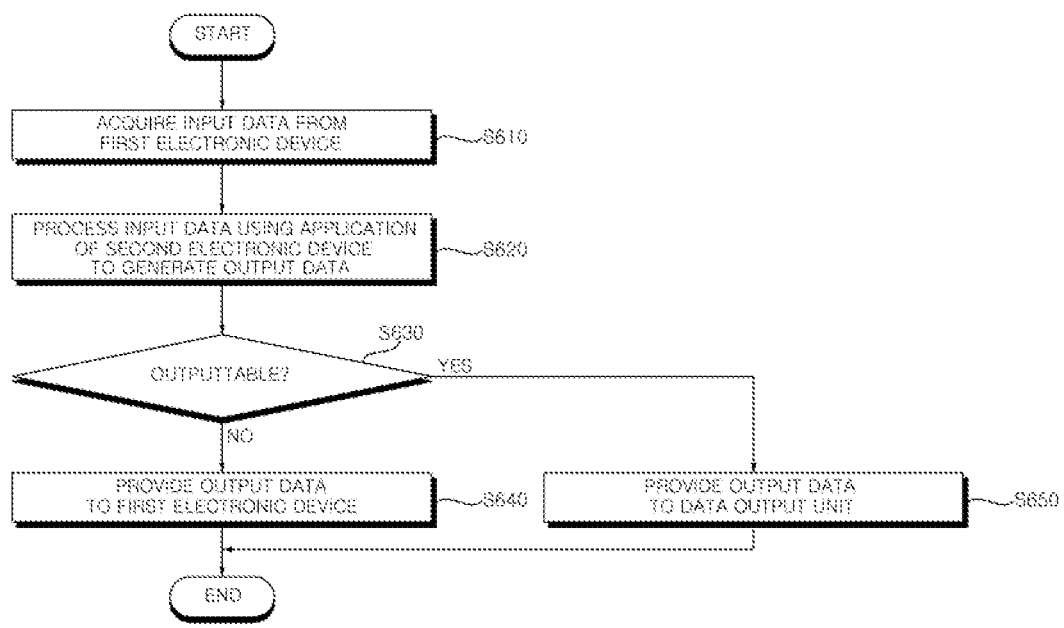

【FIG. 12】
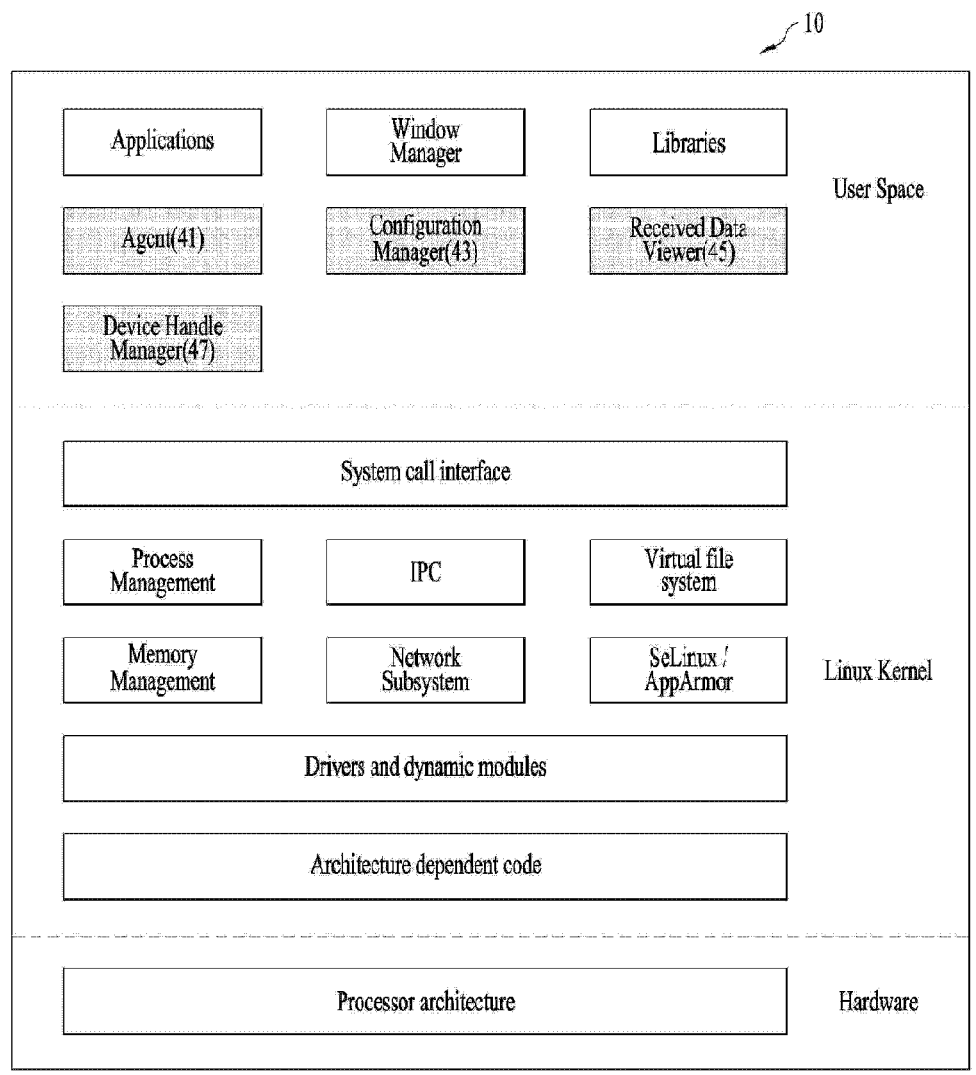

[FIG. 13]
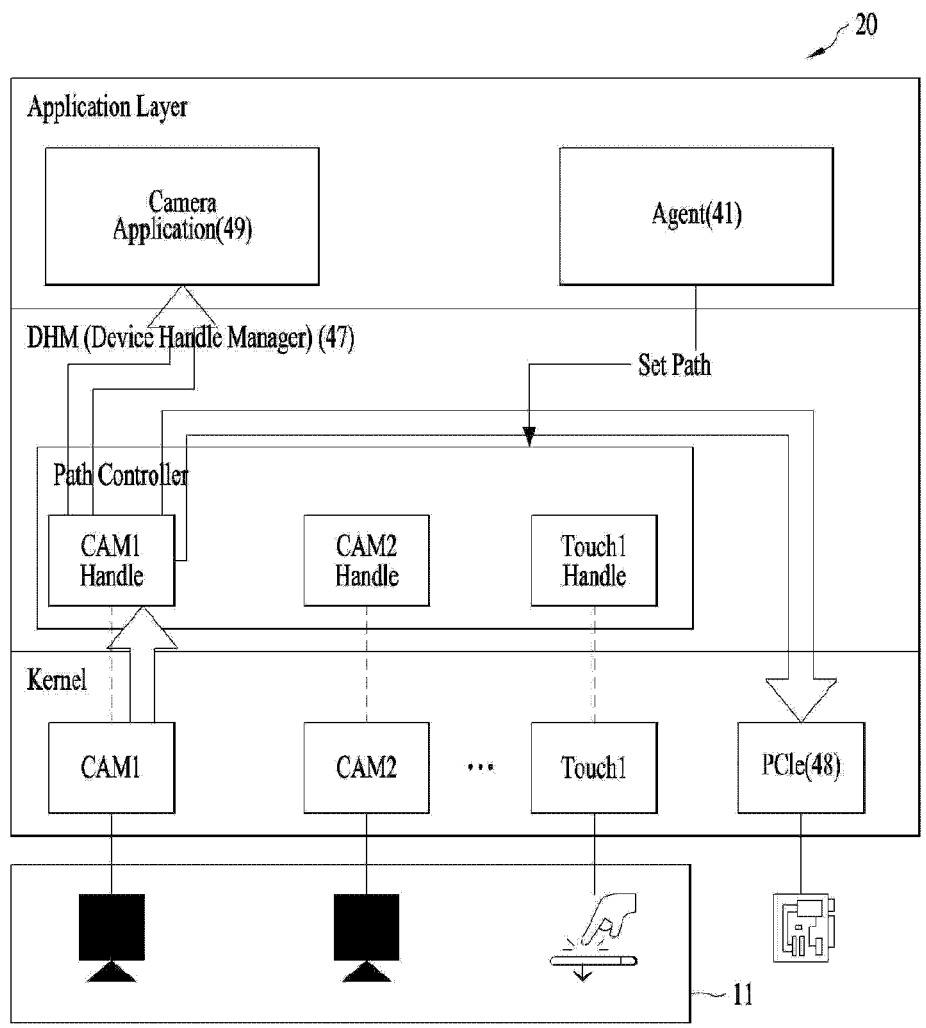

[FIG. 14]
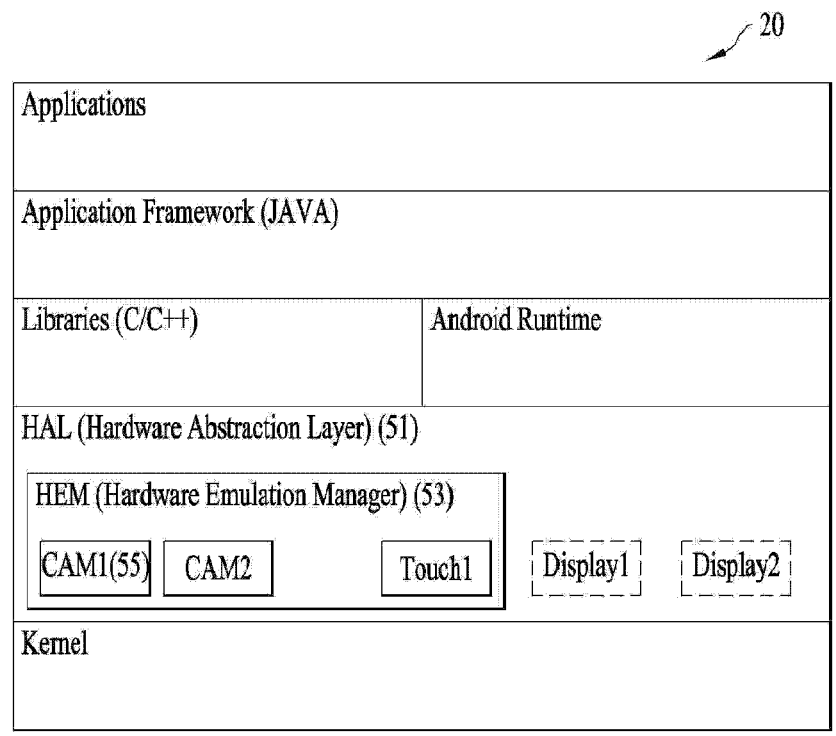

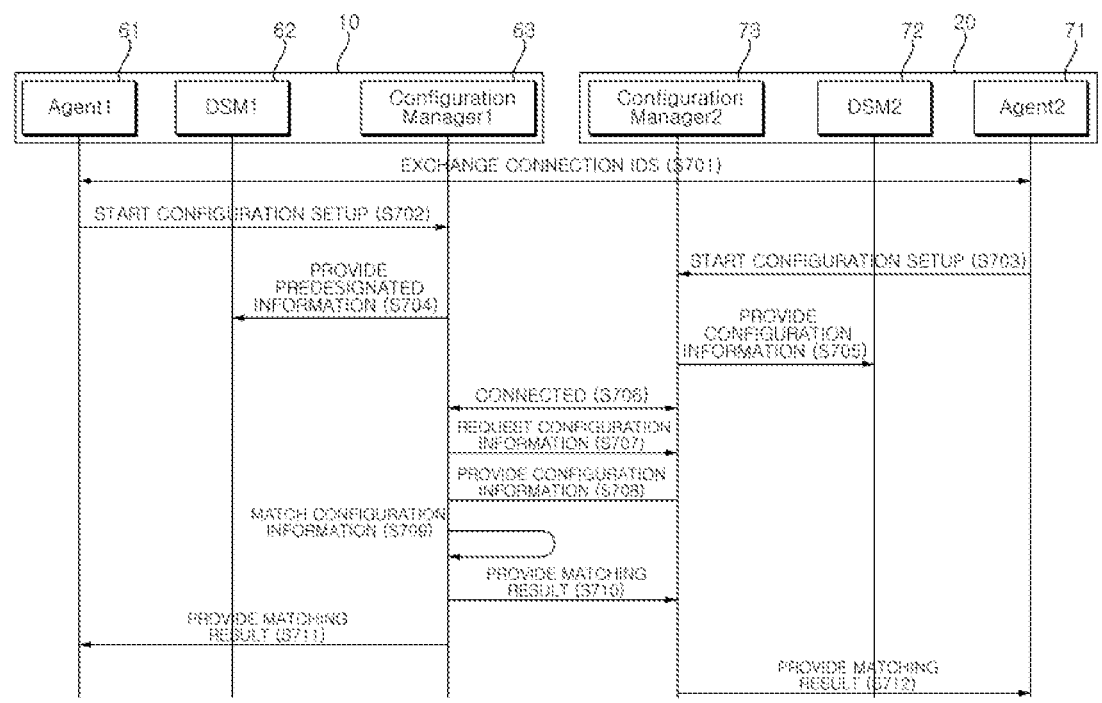
[FIG. 15]

[FIG. 16]
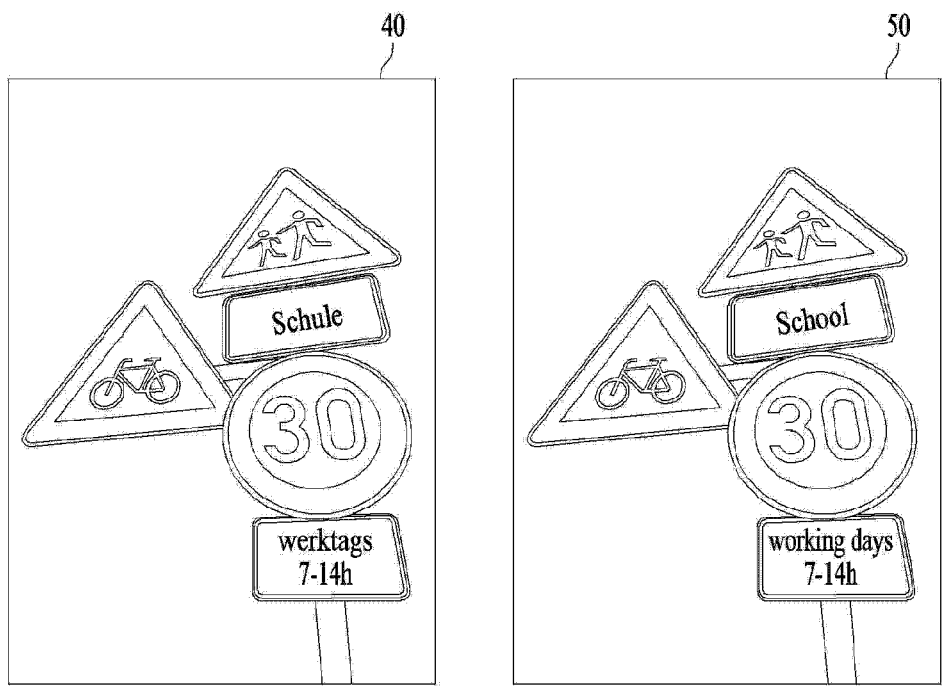

DATA PROCESSING METHOD AND ELECTRONIC DEVICE

CROSS-REFERENCE TO RELATED APPLICATIONS

This application is the National Stage filing under 35 U.S.C. 371 of International Application No. PCT/KR2019/011348, filed on Sep. 3, 2019, the contents of which are all incorporated by reference herein in its entirety.

TECHNICAL FIELD

The present disclosure relates to a data processing method between a plurality of electronic devices and to a device and method capable of enabling, based on input data acquired by one electronic device, data to be processed by another electronic device and to be output. More particularly, the present disclosure relates to a first electronic device and method capable of enabling input data acquired by a first electronic device to be processed by a second electronic device and to be output through the first electronic device.

BACKGROUND ART

With rapid development of electronic technology, various kinds of electronic devices have been popularized in everyday life. As user understanding about utilization of electronic technology increases as the result of popularization of electronic technology, users use functions provided by electronic technology in various manners.

In this aspect, interest has increased in function extension technology of extending functions through connection between a plurality of devices such that technology provided by one kind of device can be used by another kind of device. As an example of function extension technology, a mobile terminal may be connected to a television such that functions of the mobile terminal can be used through the television.

However, conventional function extension technology is based on simple mirroring technology, wherein a screen displayed on a second electronic device is merely transmitted to a first electronic device. As a result, there is a limitation in a user freely using functions of a plurality of devices.

Therefore, technology capable of enabling functions of a plurality of devices to be more efficiently and effectively used is required.

DISCLOSURE

Technical Problem

It is an object of the present disclosure to enable input data acquired by a first electronic device to be processed through a second electronic device and to be output through the first electronic device, whereby the first electronic device more effectively uses functions of the second electronic device.

It is another object of the present disclosure to a method and an electronic device capable of enabling a first electronic device to determine whether to provide information acquired through a sensor to a second electronic device, enabling the acquired information to be processed by the second electronic device when the information is provided to the second electronic device, and enabling the processed information to be output through the first electronic device.

Objects of the present disclosure are not limited to the aforementioned objects, and other unmentioned objects will be clearly understood by those skilled in the art based on the following description.

Technical Solution

A data processing method of a first electronic device according to an embodiment of the present disclosure may include checking configuration information including information about capabilities of a second electronic device based on identification of the second electronic device connected with the first electronic device, acquiring input data through at least one device related to the first electronic device, determining whether to transmit the input data to the second electronic device based on at least one of relevance of the input data to the second electronic device and the configuration information, transmitting the input data to the second electronic device based on determination of transmission of the input data, receiving output data generated based on the input data from the second electronic device, and outputting the acquired output data through an output device related to the first electronic device.

A first electronic device configured to process data according to an embodiment of the present disclosure may include a controller configured to check configuration information including information about capabilities of a second electronic device based on identification of the second electronic device connected with the first electronic device, to acquire input data through at least one device related to the first electronic device, to determine whether to transmit the input data to the second electronic device based on at least one of relevance of the input data to the second electronic device and the configuration information, to transmit the input data to the second electronic device based on determination of transmission of the input data, to receive output data generated based on the input data from the second electronic device, and to output the acquired output data through an output device related to the first electronic device.

Advantageous Effects

In a first electronic device and method for processing data according to embodiments of the present disclosure, data acquired using components (e.g. an input device and an output device) of the first electronic device may be processed through a second electronic device, and may be provided through the first electronic device, whereby the first electronic device may use functions of the second electronic device.

In addition, according to embodiments of the present disclosure, whether to transmit information acquired by the first electronic device to the second electronic device may be determined, the acquired information may be transmitted to the second electronic device based on the result of determination, and information acquired by the first electronic device may be smoothly processed using computing ability of the second electronic device, whereby usability may be improved.

Effects obtainable from the present disclosure are not limited by the above mentioned effects, and other unmentioned effects can be clearly understood from the following description by those having ordinary skill in the technical field to which the present disclosure pertains.

DESCRIPTION OF DRAWINGS

FIG. 1 is a view illustrating the case in which a first electronic device uses the function of a second electronic device.

FIG. 2 is a view conceptually illustrating a data processing method according to an embodiment of the present disclosure.

FIG. 3 is a view illustrating an application example of the data processing method according to the embodiment of the present disclosure.

FIG. 4 is a view illustrating data flow of a first electronic device and a second electronic device according to an embodiment of the present disclosure.

FIG. 5 is a functional block diagram of the first electronic device and the second electronic device according to the embodiment of the present disclosure.

FIG. 6 is a flowchart of a data processing method of the first electronic device according to the embodiment of the present disclosure.

FIG. 7 is a flowchart specifically showing an example of a step of determining whether to transmit data in the first electronic device according to the embodiment of the present disclosure.

FIG. 8 is a flowchart specifically showing another example of the step of determining whether to transmit data in the first electronic device according to the embodiment of the present disclosure.

FIG. 9 is a flowchart specifically showing a further example of the step of determining whether to transmit data in the first electronic device according to the embodiment of the present disclosure.

FIG. 10 is a flowchart of a data processing method of the second electronic device according to the embodiment of the present disclosure.

FIG. 11 is a flowchart of a data processing method of a second electronic device according to another embodiment of the present disclosure.

FIG. 12 is a functional block diagram expressing the first electronic device according to the embodiment of the present disclosure based on Linux.

FIG. 13 is a view illustrating data flow of the first electronic device according to the embodiment of the present disclosure based on Linux.

FIG. 14 is a view illustrating input data recognition in the second electronic device according to the embodiment of the present disclosure in a system aspect.

FIG. 15 is a view illustrating operation of the first electronic device and the second electronic device according to the embodiment of the present disclosure based on Linux.

FIG. 16 is a view showing an example of output data provided by the first electronic device according to the embodiment of the present disclosure.

BEST MODE

Advantages and features of the present disclosure and a method of achieving the same will be more clearly understood from embodiments described below with reference to the accompanying drawings. However, the present disclosure is not limited to the following embodiments and may be implemented in various different forms. The embodiments are provided merely to complete the present disclosure and to fully provide a person having ordinary skill in the art to which the present disclosure pertains with the category of the present disclosure. The present disclosure is defined only by the category of the claims.

In the following description of the present disclosure, a detailed description of known functions and configurations incorporated herein will be omitted unless actually necessary. In addition, terms used in the following description, which are those defined taking into consideration functions realized in accordance with the present disclosure, may vary depending upon the intention of users or operators or upon usual practices. Therefore, the definition of such terms must be made based on the disclosure of this specification.

The present disclosure may be variously modified and may have various embodiments, and specific embodiments will be shown in the drawings and will be described in detail in this specification. However, the present disclosure is not limited to the specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another.

It will be understood that, when a component is referred to as being "connected to" or "coupled to" another component, it may be directly connected to or coupled to the other component, or intervening components may be present.

FIG. 1 is a view illustrating the case in which a first electronic device uses the function of a second electronic device. Specifically, FIG. 1 shows a conventional example in which a plurality of existing devices (e.g. a first electronic device and a second electronic device) uses one function.

Referring to FIG. 1, the same screen may be displayed on the first electronic device 10 and the second electronic device 20, and therefore the first electronic device 10 and the second electronic device 20 may use the same function (e.g. reproduction of multimedia). At this time, the same function may be used based on mirroring technology (here, mirroring technology is known to those skill in the art, and therefore a detailed description thereof will be omitted).

That is, conventionally, mirroring technology in which the screen displayed on one device (e.g. the second electronic device 20) is also simply displayed on the other device is used such that the first electronic device 10 and the second electronic device 20 use one function.

As a result, there is a limitation in a user freely using functions of a plurality of devices. As will be described below, a first electronic device or a second electronic device according to an embodiment of the present disclosure may be implemented such that functions of the first electronic device and the second electronic device are more freely and effectively used. However, effects expected in the present disclosure are not limited to the above example.

FIG. 2 is a view conceptually illustrating a data processing method according to an embodiment of the present disclosure.

Referring to FIG. 2, a first electronic device 10 and a second electronic device 20 may be separate devices. For example, the first electronic device 10 may be a car embedded system included in a car 1 to provide various functions, and the second electronic device 20 may be a unit configured to be operated on a specific operating system (OS) (e.g. Android OS or iOS) and having an application installed therein to provide a predetermined function (e.g. a translation function or a game function). In the embodiment, the OS may be installed in the first electronic device 10, and the first electronic device 10 and the second electronic device 20 may be connected to each other via an interface. Also, in the embodiment, the first electronic device 10 may include an input device configured to sense various kinds of inputs and an output device configured to provide various kinds of outputs.

Depending on circumstances, the first electronic device 10 may include an input device (e.g. a camera or a microphone) and an output device (e.g. a head up display (HUD) or a speaker). In this case, the first electronic device 10 may acquire or output various kinds of data (e.g. an image or a sound).

Various kinds of applications configured to be executed by the OS of the second electronic device 20 may be installed in the second electronic device 20. Depending on circumstances, the OS of the first electronic device 10 and the OS of the second electronic device 20 may be different from each other, and the above applications may not be installed in the first electronic device 10.

In this case, functions that can be directly used by the first electronic device 10 and the second electronic device 20 may be different from each other. That is, functions that can be used by the first electronic device 10 and functions that can be used by the second electronic device 20 may be different from each other.

However, the first electronic device 10 may use functions provided by the second electronic device 20 based on connection between the first electronic device 10 and the second electronic device 20 according to the embodiment of the present disclosure. More specifically, the second electronic device 20 may receive data acquired by a sensor of the first electronic device 10, and the second electronic device 20 may process data based thereon and may provide the same to the first electronic device 10 such that the data are output therefrom.

Specifically, for example, when acquiring an image, the first electronic device 10 may transmit the same to the second electronic device 20 such that text in the image is translated using the translation function of the second electronic device 20. The first electronic device 10 may receive an image including the translated text from the second electronic device 20. Consequently, the first electronic device 10 may use the function of the second electronic device 20.

FIG. 3 is a view illustrating an application example of the data processing method according to the embodiment of the present disclosure.

Referring to FIG. 3, the first electronic device 10 included in the car 1 may acquire information about a traffic sign 2 located in front thereof. Specifically, the first electronic device 10 may acquire an image of an object or surroundings located in a movement direction (or front) of the car 1 (hereinafter, referred to as a front image) using a camera as input data.

When the traffic sign 2 is located in the movement direction of the car 1, i.e. in front of the car, as shown, the first electronic device 10 may acquire a front image of the car 1 including the traffic sign 2 through the camera.

Although not shown, the second electronic device 20 connected to the first electronic device 10 may be located in the car 1. Consequently, the first electronic device 10 may transmit the front image acquired through the camera to the second electronic device 20 such that the front image can be processed by the second electronic device 20.

The front image transmitted to the second electronic device 20 may be processed through at least one of an application included in the second electronic device 20 and a computing device included in the second electronic device 20, and may be transmitted back to the first electronic device 10. The application may perform a specific function, e.g. a translation function. In this case, the English text "SPEED LIMIT" included in the traffic sign 2 may be translated into " 제한 속도 " through the application.

The image received by the first electronic device 10, i.e. the image generated as the result of processing the front image, may be like a screen 30 of FIG. 3. That is, an image part 31 processed by the second electronic device 20, i.e. a region including the translated text " 제한 속도 ", may be included in the image received by the first electronic device 10.

FIG. 4 is a view illustrating data flow of the first electronic device and the second electronic device according to the embodiment of the present disclosure. Specifically, FIG. 4 shows data flow in a system including the first electronic device 10 and the second electronic device 20 based on the construction of each device.

Referring to FIG. 4, an input device 11 may acquire input data. The input device 11 may include at least one sensor related to the input device 11. For example, the input device 11 may include an image sensor related to a camera, a touch sensor related to a touch display, and a sound sensor related to a microphone.

The input data may be provided to at least one of an interface 15 and a system on chip (SoC) 17 through a distributor 13. For example, when the input data are related to the second electronic device 20, the input data may be provided to the interface 15. Depending on circumstances, the input data may be provided to both the interface 15 and the SoC 17.

When the input data are not related to the second electronic device 20, the input data may not be provided to the interface 15. In this case, the input data may be provided to the SoC 17.

Identification of relevance of the input data to the second electronic device 20 will be described in more detail with reference to FIG. 6.

The interface 15 may transmit the input data to the second electronic device 20. Specifically, the interface 15 may transmit the input data to an interface 21 of the second electronic device 20. Transmission of the input data may be achieved based on connection between the first electronic device 10 and the second electronic device 20 using the interfaces 15 and 21.

At this time, the interfaces 15 and 21 used in the first electronic device 10 and the second electronic device 20 may be public interfaces or high-speed public interfaces. The first electronic device 10 and the second electronic device 20 may be connected to each other through at least one of wired communication and wireless communication.

The interface 21 of the second electronic device 20 may provide the input data received from the first electronic device 10 to an SoC 23. The SoC 23 may process the input data using an application installed in the second electronic device 20 to generate output data. For example, the SoC 23 may translate text included in the input data to generate output data including the translated text.

The output data may be transmitted from the interface 21 of the second electronic device 20 to the interface 15 of the first electronic device 10. The output data may be provided from the interface 15 to the SoC 17. The SoC 17 may be provided to an output device 19 so as to be output.

Since data transmitted between the interfaces 17 and 21 are raw data, the SoC 17 may convert the output data into a form suitable to be output by the output device 19, and may provide the same to the output device 19.

As the output data are output by the output device 19, a user may use information having the function of the second electronic device 20 reflected therein.

Meanwhile, FIG. 4 shows the configuration in which the input device 11 and the output device 19 are included in the first electronic device 10. However, the present disclosure is not limited thereto, and the input device 11 and the output device 19 may be implemented as separate components and may be connected to the first electronic device 10.

Meanwhile, in the embodiment, the SoC may include at least one processor configured to control each electronic device, which may be referred to as a controller.

FIG. 5 is a functional block diagram of the first electronic device and the second electronic device according to the embodiment of the present disclosure. The term "unit" used hereinafter means a unit configured to perform at least one function or operation, which may be implemented by hardware, software, or a combination of hardware and software.

Referring to FIG. 5, the first electronic device 10 may include a connection checking unit 110, a data acquisition unit 120, a transmission unit 130, a data reception unit 140, a function unit 150, and a data output unit 160. The second electronic device 20 may include a data reception unit 210, a function unit 220, a data transmission unit 230, and a data output unit 240.

The first electronic device 10 and the second electronic device 20 may be connected to each other through interfaces, through which the first electronic device and the second electronic device may transmit and receive input data or output data. Each component (e.g. the connection checking unit 110) of the first electronic device 10 and each component (e.g. the data reception unit 210) of the second electronic device 20 may be implemented by a computing device including a microprocessor.

The connection checking unit 110 may check the second electronic device 20 connected with the first electronic device 10. The first electronic device 10 and the second electronic device 20 may be connected to each other based on public interfaces, and the connection checking unit 110 may check connection or disconnection.

The connection checking unit 110 may check connection or disconnection using various methods. For example, the connection checking unit 110 may identify a signal generated based on achievement of connection to check connection or disconnection. However, the present disclosure is not limited thereto.

The connection checking unit 110 may check configuration information including information about capability of the second electronic device 20 based on identification of the second electronic device 20 connected with the first electronic device 10. Depending on circumstances, the configuration information may further include information about the input device and the output device related to the first electronic device 10 that can be recognized by the second electronic device 20 or information about data that can be processed by the second electronic device 20.

Specifically, the information about capability may include, for example, information about at least one of capability of the processor of the second electronic device 20, the kind, number, connection mode, connection speed, supportable protocol, resolution, and number of inputs that can be simultaneously recognized (e.g. touch inputs) of the first electronic device 10 that can be recognized by the second electronic device 20, and data capacity that can be processed by the second electronic device 20 in a predetermined time. More various kinds of information about capability of the electronic device, such as data processing efficiency, may be calculated based thereon.

The information about the input device and the output device may include, for example, information about at least one of presence or absence of the input device or the output device included in the second electronic device 20, the kind and number of the input device or the output device, if present, and the kind of input data that can be processed by the second electronic device 20 (e.g. an image or a sound).

Such configuration information may be received by the data reception unit 140, a description of which will follow, and the transmission unit 130 may acquire and identify the configuration information from the data reception unit 140. However, the present disclosure is not limited thereto. Depending on circumstances, the transmission unit 130 may directly receive the configuration information, or may receive the configuration information through a separate component.

The data acquisition unit 120 may acquire input data through at least one sensor related to the first electronic device 10. The at least one sensor may be included in various input devices included in the first electronic device 10. For example, the at least one sensor may be an image sensor configured to acquire an image, which is included in an input device, such as a camera, a touch sensor configured to recognize touch input, which is included in an input device, such as a touch display, and a sound sensor configured to recognize a sound, which is included in an input device, such as a microphone. In this specification, the at least one sensor is not limited to the above-specified examples.

Input data are data acquired through the at least one sensor. When the at least one sensor includes a sensor configured to acquire an image, the input data may include an image.

The transmission unit 130 may identify relevance of the input data to the second electronic device 20 to determine whether to transmit the input data to the second electronic device 20. Specifically, the transmission unit 130 may identify whether the input data are related to the second electronic device 20. When the input data are related to the second electronic device 20, i.e. when the input data have relevance to the second electronic device 20, the transmission unit 130 may determine transmission of the input data to the second electronic device 20.

In an embodiment, the transmission unit 130 may check whether the input data have been acquired by request of the second electronic device 20. Specifically, the transmission unit 130 may check whether a request signal has been received from the second electronic device 20 based on the connection between the first electronic device 10 and the second electronic device 20 or whether the input data have been acquired by request of the second electronic device 20 based on whether the received request signal is related to the input data. As described above, the sensor of the first electronic device 10 may be controlled by a control signal of the second electronic device 20, and data acquired through the sensor may be transmitted to the second electronic device 20 under control of the second electronic device 20.

Upon checking that the input data have been acquired by request of the second electronic device 20, the transmission unit 130 may determine transmission of the input data to the second electronic device 20.

In an embodiment, the transmission unit 130 may identify whether a specific condition is satisfied based on at least one of relevance of the input data to the second electronic device 20 and the configuration information, and when the specific condition is satisfied, may determine transmission of at least some of the input data to the second electronic device 20.

At this time, the specific condition may include at least one of the case in which the input data have been acquired by request of the second electronic device, the case in which data processing efficiency of the first electronic device 10 is a specific value or less, the case in which data processing efficiency of the first electronic device 10 is lower than data processing efficiency of the second electronic device 20, the case in which the input data are data that can be processed through the second electronic device 20, the case in which data processing efficiency of the first electronic device 10 is increased to the specific value or more when the input data are parallel-processed by the first electronic device 10 and the second electronic device 20, and the case in which user input to the first electronic device 10 to transmit the input data to the second electronic device 20 is received.

Depending on circumstances, when data processing efficiency of the first electronic device 10 is a predetermined value or more, the transmission unit 130 may provide the input data to each of the first electronic device 10 and the second electronic device 20. Alternatively, when data processing efficiency of the first electronic device 10 is the predetermined value or less, the transmission unit 130 may provide some of the input data to the function unit 150 of the first electronic device 10, and may transmit the remainder of the input data to the second electronic device 20. In this case, the input data may be processed through the first electronic device 10 and the second electronic device 20.

When the specific condition is not satisfied, the input data may be processed by the function unit 150 of the first electronic device 10, a description of which will follow, and therefore output data may be generated. The output data may be output through the data output unit 160.

In an embodiment, the transmission unit 130 may check a connection identifier related to the second electronic device 20. The transmission unit 130 may determine whether to transmit the input data to the second electronic device 20 based on the connection identifier.

For example, when the connection identifier related to the second electronic device 20 is present or the connection identifier related to the second electronic device 20 corresponds to a specific connection identifier, the transmission unit 130 may determine transmission of the input data to the second electronic device 20.

The transmission unit 130 may transmit the input data to the second electronic device 20 based on determination of transmission of the input data. Specifically, when determining transmission of the input data, the transmission unit 130 may transmit the input data to the second electronic device 20 based on connection between the first electronic device 10 and the second electronic device 20 (e.g. connection through public interfaces).

Depending on circumstances, the transmission unit 130 may transmit the input data to the second electronic device 20 on a hardware abstraction layer (HAL) of a device related to the input data (e.g. the input device). In the embodiment, as described above, data transmitted and received between the electronic devices may be data on the HAL, and the input data may be communicated between the electronic devices through the interfaces on the HAL. At this time, the data communicated on the HAL may be raw data. More specifically, data acquired by the sensor of the first electronic device 10 may be distributed from a HAL 51 (see FIG. 14) of the sensor to an interface unit for communication with the second electronic device 20. The data acquired by the sensor of the first electronic device 10 may be transmitted to the second electronic device 20 through the interface unit.

The data reception unit 140 may receive output data generated based on the input data from the second electronic device 20. As will be described below, the second electronic device 20 may receive the input data from the transmission unit 130 through the data reception unit 210, and may process the input data through the function unit 220 to generate output data. The output data may be transmitted from the second electronic device 20 to the first electronic device 10. The data reception unit 140 may receive the output data from the second electronic device 20 based thereon.

As will be described below, the output data may include data obtained by processing the input data through an application included in the second electronic device 20. As an example, the first electronic device 10 may use an application that is not installed in the first electronic device 10, i.e. an application included in the second electronic device 20.

The data reception unit 140 may include a public interface, through which the data reception unit may receive the output data. At this time, the public interface of the data reception unit 140 and the public interface of the transmission unit 130 may be integrally or individually formed.

The function unit 150 may perform the functions of various applications executable in the first electronic device 10. Specifically, the function unit 150 may be implemented so as to include the SoC 17 in order to perform a predetermined function based on an application executable by the OS of the first electronic device 10.

The function unit 150 may process the output data into a form suitable for the first electronic device 10. For example, the function unit 150 may process the output data received in the form of raw data so as to be converted into a form that can be output by the first electronic device 10.

The data output unit 160 may receive the output data through the function unit 150, and may output the same through the output device. For example, when the output data are an image, the data output unit 160 may output the same on the display such that the image is displayed.

The data reception unit 210 of the second electronic device 20 may receive the input data from the transmission unit 130 of the first electronic device 10. The data reception unit 210 may include a public interface, through which the data reception unit may receive the input data.

The function unit 220 may perform the functions of various applications executable in the second electronic device 20. Specifically, the function unit 220 may execute various applications executable by the OS of the second electronic device 20 such that the functions of the applications are performed. For example, when the second electronic device 20 has the Android OS and an application for translation is installed therein, the function unit 220 may perform a text translation function.

The function unit 220 may process the received input data through the application included in the second electronic device 20 based thereon. Consequently, the function unit 220 may generate output data including the data processed through the application.

Meanwhile, the OS of the second electronic device 20 may be different from the OS of the first electronic device 10, and the application included in the second electronic device 20 may not be installed in the first electronic device 10. Consequently, the output data may be data acquired through the first electronic device 10 but processed by the function of the second electronic device 20. In this case, the first electronic device 10 may effectively use various functions through connection with the second electronic device 20 without replacement with a new system.

The data transmission unit 230 may transmit the output data to the first electronic device 10. Specifically, the data transmission unit 230 may transmit the output data to the data reception unit 140 of the first electronic device 10.

The data transmission unit 230 may include a public interface, through which the data transmission unit may transmit the output data to the data reception unit 140. At this time, the public interface of the data transmission unit 230 and the public interface of the data reception unit 210 may be integrally or individually formed.

Depending on circumstances, the second electronic device 20 may include a data output unit 240. The data output unit 240, which may be a display or a speaker, may output data having a specific form in order to provide information to the user.

When the output data generated through the function unit 220 satisfies a specific condition, the data output unit 240 may output the output data received from the function unit 220. For example, the specific condition may include the case in which the output data generated through the function unit 220 are data in a form that can be output through the data output unit 240. However, the specific condition may be configured in various forms, and is not limited to the example described in this specification.

Although not shown, depending on circumstances, the first electronic device 10 may include a controller configured to control operation of the components included in the first electronic device 10. In this case, each component (e.g. the connection checking unit 110) of the first electronic device 10 shown in FIG. 5 may be controlled by the controller.

In addition, the second electronic device 20 may also include a separate controller. In this case, each component of the second electronic device 20 may be controlled by the controller.

FIG. 6 is a flowchart of a data processing method of the first electronic device according to the embodiment of the present disclosure. Steps of the method shown in FIG. 6 may be performed in a sequence different from the sequence shown in the figure, and contents identical to FIGS. 1 to 5 may be omitted.

Referring to FIG. 6, the connection checking unit 110 may check the second electronic device 20 connected with the first electronic device 10 (S110). Specifically, the connection checking unit 110 may check configuration information including information about capability of the second electronic device based on identification of the second electronic device connected with the first electronic device 10.

The data acquisition unit 120 may acquire input data (S120). Specifically, the data acquisition unit 120 may acquire input data through at least one device (or a sensor) related to the first electronic device 10. At this time, the at least one device may be an input device or a sensor included in the input device.

The transmission unit 130 may identify the input data in order to determine whether to transmit the input data (S130). Specifically, the transmission unit 130 may determine whether to transmit the input data to the second electronic device 20 based on at least one of relevance of the input data to the second electronic device 20 and the configuration information. A more detailed description related to determination as to whether to transmit the input data will be described below with reference to FIGS. 7 to 9. Meanwhile, whether to transmit the input data may also be determined based on a control signal received by the second electronic device 20, in addition to identification of the input data.

Upon determining transmission of the input data, the transmission unit 130 may transmit the input data to the second electronic device 20 (S140). Specifically, the transmission unit 130 may transmit the input data to the second electronic device 20 (e.g. the data reception unit 210 of the second electronic device 20) based on connection between the first electronic device 10 and the second electronic device 20 through the public interfaces.

The data reception unit 140 may receive output data from the second electronic device 20 (S150). Here, the output data, which are related to the input data, may be, for example, data processed by the second electronic device 20 based on the input data.

The data output unit 160 may output the output data (S160). Depending on circumstances, the data output unit 160 may receive the output data converted into a form suitable for output through the function unit 150, and may output the same. In the embodiment, the data output unit 160 may transmit feedback information related to output of the output data to the second electronic device 20, and the second electronic device 20 may process the input data in consideration thereof.

Depending on circumstances, the data output unit 160 may include a plurality of output devices. In this case, the output data may be output through the plurality of output devices.

FIG. 7 is a flowchart specifically showing an example of a step of determining whether to transmit data in the first electronic device according to the embodiment of the present disclosure. Specifically, FIG. 7 shows an embodiment of step S130 of FIG. 6.

Referring to FIG. 7, the transmission unit 130 may check whether the input data have been acquired by request of the second electronic device 20 (S210). Depending on circumstances, the data reception unit 140 may receive a signal for requesting the input data from the second electronic device 20 in response to successful connection with the second electronic device 20.

The signal for requesting the input data may include, for example, information about at least one of an input device related to the input data, the port number of the first electronic device 10 to which the input device is connected (in which the input device is included), and the kind of the input data. Also, in the embodiment, the second electronic device 20 may generate one or more connections with the first electronic device 10, and the second electronic device 20 may control the input device of the first electronic device 10 based on identification information of each connection. In addition, the first electronic device 10 may transmit data acquired through the input device based on the identification information of each connection.

The transmission unit 130 may identify whether such a signal has been received or information included in the signal to check whether the input data have been acquired by request of the second electronic device 20.

When the input data have been acquired by request of the second electronic device 20, the transmission unit 130 may determine transmission of the input data to the second electronic device 20 (S220).

When the input data have not been acquired by request of the second electronic device 20, the transmission unit 130 may transmit the input data to the function unit 150. In this case, the input data may be processed by the function unit 150, and may be output through the data output unit 160.

FIG. 8 is a flowchart specifically showing another example of the step of determining whether to transmit data in the first electronic device according to the embodiment of the present disclosure. Specifically, FIG. 8 shows another embodiment of step S130 of FIG. 6.

Referring to FIG. 8, the transmission unit 130 may check configuration information about connection with the first electronic device 10 from the second electronic device 20 (S310). Depending on circumstances, when checking the second electronic device in step S110 of FIG. 6 in response to achievement of connection with the second electronic device 20, the data reception unit 140 may receive configuration information about connection with the first electronic device 10 from the second electronic device 20.

The configuration information may include information about capabilities of the second electronic device 20. Depending on circumstances, the configuration information may further include information about an input device and an output device related to the first electronic device 10 that can be recognized by the second electronic device 20.

Specifically, the information about capabilities may include, for example, information about at least one of capabilities of the processor of the second electronic device 20, the kind, number, connection mode, connection speed, supportable protocol, resolution, and number of inputs that can be simultaneously recognized (e.g. touch inputs) of the first electronic device 10 that can be recognized by the second electronic device 20, and data capacity that can be processed by the second electronic device 20 in a predetermined time.

The information about the input device and the output device may include, for example, information about at least one of presence or absence of the input device or the output device included in the second electronic device 20, the kind and number of the input device or the output device, if present, and the kind of input data that can be processed by the second electronic device 20 (e.g. an image or a sound).

When the received configuration information coincides with specific information, the transmission unit 130 may determine transmission of the input data to the second electronic device 20 (S320). When the received configuration information does not coincide with specific information, the transmission unit 130 may transmit the input data to the function unit 150. In this case, the input data may be processed by the function unit 150, and may be output through the data output unit 160.

Depending on circumstances, the transmission unit 130 may identify whether a specific condition is satisfied based on the configuration information, and when the specific condition is satisfied, may determine transmission of the input data to the second electronic device 20.

At this time, the specific condition may include at least one of the case in which the input data have been acquired by request of the second electronic device, the case in which data processing efficiency of the first electronic device 10 is a specific value or less, the case in which data processing efficiency of the first electronic device 10 is lower than data processing efficiency of the second electronic device 20, the case in which the input data are data that can be processed through the second electronic device 20, the case in which data processing efficiency of the first electronic device 10 is increased to the specific value or more when the input data are parallel-processed by the first electronic device 10 and the second electronic device 20, and the case in which user input to the first electronic device 10 to transmit the input data to the second electronic device 20 is received.

FIG. 9 is a flowchart specifically showing a further example of the step of determining whether to transmit data in the first electronic device according to the embodiment of the present disclosure. Specifically, FIG. 9 shows a further embodiment of step S130 of FIG. 6.

Referring to FIG. 9, the transmission unit 130 may check a connection identifier related to the second electronic device 20 (S410). The connection identifier may be specific unique information for identifying the second electronic device 20 that can receive input data from the first electronic device 10. The first electronic device 10 may store information about the connection identifier in advance, and the transmission unit 130 may check the connection identifier related to the second electronic device 20 based thereon (S410).

When the connection identifier corresponds to the specific information, the transmission unit 130 may determine transmission of the input data to the second electronic device 20 (S420). When the connection identifier does not correspond to the specific information, the transmission unit 130 may transmit the input data to the function unit 150. In this case, the input data may be processed by the function unit 150, and may be output through the data output unit 160.

FIG. 10 is a flowchart of a data processing method of the second electronic device according to the embodiment of the present disclosure.

Referring to FIG. 10, the data reception unit 210 may receive input data from the first electronic device 10 (S510). Specifically, the data reception unit 210 may receive input data from the transmission unit 130 of the first electronic device 10 through the public interface.

The function unit 220 may process the acquired input data using the application of the second electronic device 20 to generate output data (S520). The OS of the second electronic device 20 may be different from the OS of the first electronic device 10, and therefore the application of the second electronic device 20 may be executable by the OS of the second electronic device 20. The function unit 220 may process the input data using the application executable by the OS of the second electronic device 20.

For example, the application of the second electronic device 20 may be an application for text translation. Consequently, the function unit 220 may translate text included in the input data to generate output data. The generated output data may be data in which the portion of the input data corresponding to the text is replaced with translated text. Also, in the embodiment, the application may be an application for executing at least one of image processing and sound processing.

Depending on circumstances, the function unit 220 may perform data processing in a HAL region (or a driver region or a hardware region) of the second electronic device 20 based on reception of the input data through the public interface. Consequently, the second electronic device 20 may recognize that the input data have been acquired by itself, not through the first electronic device 10.

The data transmission unit 230 may provide the output data to the first electronic device 10 (S530). The data transmission unit 230 may provide the output data to the data reception unit 140 of the first electronic device 10 through the public interface. In the embodiment, in response to output of the output data, the first electronic device 10 may output information indicating that the output has been generated by the second electronic device 20.

FIG. 11 is a flowchart of a data processing method of a second electronic device according to another embodiment of the present disclosure. Specifically, FIG. 11 shows an example of a flowchart of a data processing method when the second electronic device 20 includes a separate data output unit 240.

Referring to FIG. 11, the data reception unit 210 may acquire input data from the first electronic device 10 (S610). Step S610 may correspond to step S510 of FIG. 10.

The function unit 220 may process the input data using the application of the second electronic device 20 to generate output data (S620). Step S620 may correspond to step S520 of FIG. 10.

The function unit 220 may check whether the output data can be output through the data output unit 240 (S630). For example, the function unit 220 may check whether the data output unit 240 is included in the second electronic device 20. When the data output unit 240 is included in the second electronic device 20, the function unit 220 may identify the condition of data that can be output through the data output unit 240. The function unit 220 may check whether to output the output data based on whether the condition of data that can be output through the data output unit 240 coincides with the output data.

When the output data cannot be output through the data output unit 240, the function unit 220 may provide the output data to the first electronic device 10 through the data transmission unit 230 (S640). When the output data can be output through the data output unit 240, the function unit 220 may provide the output data to the data output unit 240 (S650).

FIG. 12 is a functional block diagram expressing the first electronic device according to the embodiment of the present disclosure based on Linux. Specifically, FIG. 12 shows the Linux system structure of the first electronic device 10. Hereinafter, a description of the construction known to those skilled in the art related to the Linux system structure will be omitted.

Referring to FIG. 12, the first electronic device 10 may include an agent 41, a configuration manager (hereinafter referred to as a manager) 43, a received data viewer (hereinafter referred to as a viewer) 45, and a device handle manager (hereinafter referred to as a DHM) 47 in a user space.

The agent 41 may control the DHM 47 using configuration information read from the manager 43. The manager 43 may manage various kinds of information related to transmission of input data to the second electronic device 20, such as information about an input device capable of transmitting input data (e.g. the kind and identifier of the input device) or information about rules related to transmission of input data.

The viewer 45 may display various received data so as to be recognized by the user. The data displayed by the viewer 45 may include, for example, data received from the second electronic device 20.

The DHM 47 may have authority to access the input device configured to be capable of transmitting the input data to the second electronic device 20. Consequently, the DHM 47 may prevent direct access to the input device not via the DHM 47.

The DHM 47 may control data flow. Specifically, the DHM 47 may adjust a transmission path of input data acquired through at least one sensor of the input device.

When the input data are not related to the second electronic device 20, the DHM 47 may adjust the transmission path of the input data according to a general data processing flow (e.g. output via the application of the first electronic device 10).

When the input data are related to the second electronic device 20, the DHM 47 may adjust the transmission path of the input data such that the input data are transmitted to the second electronic device 20. For example, when the input data are related to the second electronic device 20, the DHM 47 may adjust the transmission path of the input data such that the input data are transmitted to the second electronic device 20 through a peripheral component interconnect express (PCIe) adaptor (hereinafter referred to as PCIe).

Meanwhile, for a more detailed example related to the data transmission path of the DHM 47, refer to FIG. 13.

FIG. 13 is a view illustrating data flow of the first electronic device according to the embodiment of the present disclosure based on Linux.

Referring to FIG. 13, the DHM 47 may have authority to control the input device 11 of the first electronic device 10. The DHM 47 may control the transmission path of input data acquired through the input device 11 under control of the agent 41.

For example, when acquisition of the input data of the input device 11 is requested through an application 49 of the first electronic device 10, the DHM 47 may transmit the input data acquired from the input device 11 to the camera application (hereinafter referred to as an application) 49. When acquisition of the input data of the input device 11 is requested through the second electronic device 20, however, the DHM 47 may transmit the input data acquired from the input device 11 to the PCIe 48. Consequently, the input data may be transmitted to the second electronic device 20 through the PCIe 48.

FIG. 14 is a view illustrating input data recognition in the second electronic device according to the embodiment of the present disclosure in a system aspect. Specifically, FIG. 14 illustrates the case in which the Android OS is applied to the second electronic device 20 by way of example.

In the Android OS, access to hardware is possible through the hardware abstraction layer (HAL) 51, and a method of accessing the HAL 51 may be standardized by HAL interface definition language (HIDL).

Referring to FIG. 14, the HAL 51 may include a hardware emulation manager (HEM) 53 configured to process data related to the first electronic device 10. The HEM 53 may have authority related to the input device of the first electronic device 10. Here, the authority of the HEM 53 may be authority for a shadow device corresponding to the input device of the first electronic device 10. For example, when the input device includes a CAM1 55, the HEM 53 may have authority to acquire input data related to the CAM1 55 from the first electronic device 10 and to control the same.

The HEM 53 may receive the input data from the first electronic device 10, and may provide the received input data to the application of the second electronic device 20 such that the input data are processed by the application.

FIG. 15 is a view illustrating operation of the first electronic device and the second electronic device according to the embodiment of the present disclosure based on Linux. Specifically, FIG. 15 is a view illustrating information exchange for determination as to whether to transmit input data between the first electronic device 10 and the second electronic device 20 based on Linux.

Referring to FIG. 15, the first electronic device 10 may include an agent1 61, a DSM1 62, and a configuration manager1 (hereinafter referred to as a manager1) 63, and the second electronic device 20 may include an agent2 71, a DSM2 72, and a configuration manager2 (hereinafter referred to as a manager2) 73.

The agent1 61 and the agent2 71 may exchange connection IDs with each other (S701). The agent1 61 may request start of configuration setup from the manager1 63 such that the configuration setup is started (S702). The agent2 71 may request start of configuration setup from the manager2 73 such that the configuration setup is started (S703). In the embodiment, the connection ID may include connection identification information, and connection between a specific sensor and the electronic device may be identified based on the connection ID.

When the configuration setup is started, the manager1 63 may provide specific information related to connection to the DSM1 62 (S704), and the manager2 73 may provide configuration information to the DSM2 72 (S705).

When the manager1 63 and the manager2 73 are connected with each other (S706), the manager1 63 may request the configuration information from the manager2 73 (S707). Consequently, the manager2 73 may provide the configuration information to the manager1 63 (S708).

The manager1 63 may receive the configuration information, and may start matching with specific information in relation to connection of the first electronic device 10 (S709).

After matching is completed, the manager1 63 may transmit a result about matching success or failure (hereinafter referred to as a matching result) to the agent1 61 and the manager2 73 (S710 and S711). Upon receiving information about the matching result from the manager1 63, the manager2 73 may provide the information about the matching result to the agent2 71 (S712).

Although not shown, when matching is successful, the input data acquired from the first electronic device 10 may be transmitted to the second electronic device 20. When matching is unsuccessful, the input data acquired from the first electronic device 10 may not be transmitted to the second electronic device 20.

FIG. 16 is a view showing an example of output data provided by the first electronic device according to the embodiment of the present disclosure. Specifically, FIG. 16 shows the case in which input data are an image and a function available in the second electronic device is a translation function by way of example.

An image1 40 of FIG. 16 may indicate input data acquired by the first electronic device 10. An image2 50 may indicate output data finally output by the first electronic device 10 after receiving output data generated by the second electronic device 20.

The image1 40 includes first-language text "Schule" and "werktags". The image1 40 may be acquired by the first electronic device 10 and may be transmitted to the second electronic device 20. Consequently, the text may be translated by the translation application of the second electronic device 20.

As a result, the first-language text "Schule" and "werktags" in the image1 40 may be translated, and second-language text "School" and "working days" may be displayed in corresponding regions.

A first electronic device 10 according to an embodiment of the present disclosure may be configured such that, when a new second electronic device 20 is connected to the existing first electronic device 10, the first electronic device 10 is capable of using the function of the second electronic device 20, whereby a user of the first electronic device 10 may use the latest functions available only in the second electronic device 20 without replacement of the first electronic device 10.

In addition, the first electronic device 10 according to the embodiment of the present disclosure may extend functions that are provided by another device, i.e. the second electronic device 20, such that the functions can be easily provided through the first electronic device 10. Consequently, the user of the first electronic device 10 may more effectively experience the functions provided by the second electronic device 20.

A second electronic device 20 according to an embodiment of the present disclosure may be implemented as a simple unit in which a predetermined OS is executable without inclusion of an output device, whereby high productivity may be achieved. In addition, since the second electronic device 20 can be manufactured in a small size, the second electronic device 20 may be more easily connected to the first electronic device 10, whereby high utilization may be achieved.

Combinations of blocks of block diagrams and steps of the flowcharts appended to this specification may be performed by computer program instructions. Since the computer program instructions may be installed in a general-purpose computer, a special-purpose computer, or a processor of programmable data processing equipment, the instructions performed through the computer or the processor of the programmable data processing equipment generate a means configured to execute functions described in the blocks of the block diagrams or the steps of the flowcharts. Since the computer program instructions may be stored in a computer-usable or computer-readable memory for the computer or the processor of the programmable data processing equipment in order to implement functions in a specific manner, it is also possible to produce products including instruction means that execute functions described in the blocks of the block diagrams or the steps of the flowcharts using the instructions stored in the computer-usable or computer-readable memory. Since the computer program instructions may be loaded in the computer or the processor of the programmable data processing equipment, instructions for generating a process executed by the computer by performing a series of operation steps in the computer or the processor of the programmable data processing equipment in order to operate the computer or the processor of the programmable data processing equipment may also provide steps for executing the functions described in the blocks of the block diagrams or the steps of the flowcharts.

In addition, each block or each step may indicate a portion of a module, segment, or code including one or more executable instructions for performing specific logical function(s). In addition, it should be noted that, in some alternative embodiments, functions mentioned in the blocks or the steps may occur while deviating from the sequence. For example, two successively shown blocks or steps may be simultaneously performed, or the blocks or the steps may be performed in reverse order according to corresponding functions.

The above description merely illustrates the technical concept of the present disclosure, and it will be apparent to those skilled in the art that various modifications and alterations are possible without departing from intrinsic characteristics of the present disclosure. Therefore, the embodiments of the present disclosure do not define but describe the technical concept of the present disclosure, and the scope of the technical concept of the present disclosure is not limited by the embodiments. The scope of protection of the present disclosure should be determined by the appended claims, and all changes falling within the meaning and equivalency range of the appended claims are intended to be embraced therein.

The invention claimed is:

1. A data processing method of a first electronic device embedded in a vehicle, the data processing method comprising:
checking configuration information comprising information about capabilities of a second electronic device based on identification of the second electronic device connected with the first electronic device;
acquiring input data through at least one device related to the first electronic device;
determining whether to transmit the input data to the second electronic device based on at least one of relevance of the input data to the second electronic device or the configuration information;
transmitting the input data to the second electronic device based on determination of transmission of the input data;
receiving output data generated based on the input data from the second electronic device; and
outputting the acquired output data through an output device related to the first electronic device,
wherein the input data includes an image of an object or surroundings located in a movement direction of the vehicle using a camera,
wherein the first electronic device and the second electronic device connected with the first electronic device are located inside the vehicle,
wherein based on an application for processing the image corresponding to an application not capable of being installed on the first electronic device and to an application installed on the second electronic device, the image is transmitted to the second electronic device,
wherein the first electronic device receives and displays the output data processed based on the image in the application installed on the second electronic device in a state in which the output data processed in the application installed on the second electronic device is not displayed on the second electronic device.

2. The data processing method according to claim 1, wherein
determining whether to transmit the input data comprises identifying whether a specific condition is satisfied based on the at least one of relevance of the input data to the second electronic device or the configuration information, and when the specific condition is satisfied, determining transmission of at least some of the input data to the second electronic device.

3. The data processing method according to claim 2, wherein
determining whether to transmit the input data comprises, when the specific condition is not satisfied, processing, by the first electronic device, the input data to generate output data and outputting the output data generated through processing by the first electronic device through the output device.

4. The data processing method according to claim 1, wherein the configuration information further comprises information about an input device and the output device related to the first electronic device that can be recognized by the second electronic device.

5. The data processing method according to claim 1, wherein the output data comprise data obtained by processing the input data through an application included in the second electronic device.

6. The data processing method according to claim 1, wherein outputting the output data comprises outputting information indicating that the output data have been processed by the second electronic device.

7. The data processing method according to claim 1, wherein the input data are transmitted to the second electronic device on a hardware abstraction layer (HAL) of a device related to the input data.

8. The data processing method according to claim 1, further comprising:
checking a connection identifier related to the second electronic device, wherein
the input data are transmitted to the second electronic device based on the connection identifier.

9. The data processing method according to claim 1, wherein
the at least one device comprises an image sensor,
the input data comprise an image acquired by the image sensor, and
the output data comprise translation information generated by translating, by the second electronic device, text in the image acquired by the image sensor.

10. The data processing method according to claim 9, wherein the output data comprise an image in which the text of the input data is replaced with the translation information.

11. A first electronic device embedded in a vehicle and configured to process data, the first electronic device comprising a controller configured to:
check configuration information comprising information about capabilities of a second electronic device based on identification of the second electronic device connected with the first electronic device;
acquire input data through at least one device related to the first electronic device;
determine whether to transmit the input data to the second electronic device based on at least one of relevance of the input data to the second electronic device or the configuration information;
transmit the input data to the second electronic device based on determination of transmission of the input data;
receive output data generated based on the input data from the second electronic device; and
output the acquired output data through an output device related to the first electronic device,
wherein the input data includes an image of an object or surroundings located in a movement direction of the vehicle using a camera,
wherein the first electronic device and the second electronic device connected with the first electronic device are located inside the vehicle,
wherein based on an application for processing the image corresponding to an application not capable of being installed on the first electronic device and to an application installed on the second electronic device, the image is transmitted to the second electronic device,
wherein the controller of the first electronic device is further configured to receive an image processed by the application installed on the second electronic device, and
wherein the first electronic device receives and displays the output data processed based on the image in the application installed on the second electronic device in a state in which the output data processed in the application installed on the second electronic device is not displayed on the second electronic device.

12. The first electronic device according to claim 11, wherein
the controller is further configured to identify whether a specific condition is satisfied based on the at least one of relevance of the input data to the second electronic device or the configuration information, and when the specific condition is satisfied, to determine transmission of at least some of the input data to the second electronic device.

13. The first electronic device according to claim 12, wherein the controller is further configured to, when the specific condition is not satisfied, process, by the first electronic device, the input data to generate output data and to output the output data generated through processing by the first electronic device through the output device.

14. The first electronic device according to claim 11, wherein the configuration information further comprises information about an input device and the output device related to the first electronic device that can be recognized by the second electronic device.

15. The first electronic device according to claim 11, wherein the output data comprise data obtained by processing the input data through an application included in the second electronic device.

16. The first electronic device according to claim 11, wherein the controller is further configured to output information indicating that the output data have been processed by the second electronic device.

17. The first electronic device according to claim 11, wherein the input data are transmitted to the second electronic device on a hardware abstraction layer (HAL) of a device related to the input data.

18. The first electronic device according to claim 11, wherein
the controller is further configured to further check a connection identifier related to the second electronic device, and
the input data are transmitted to the second electronic device based on the connection identifier.

19. The first electronic device according to claim 11, wherein
the at least one device comprises an image sensor,
the input data comprise an image acquired by the image sensor, and
the output data comprise translation information generated by translating, by the second electronic device, text in the image acquired by the image sensor.

20. The first electronic device according to claim 19, wherein the output data comprise an image in which the text of the input data is replaced with the translation information.

21. The data processing method according to claim 1, wherein
the input data are transmitted to the second electronic device through a high-speed serial interface, and
the output data are received from the second electronic device through the high-speed serial interface.

22. The first electronic device according to claim 11, wherein
the input data are transmitted to the second electronic device through a high-speed serial interface, and
the output data are received from the second electronic device through the high-speed serial interface.

* * * * *